United States Patent Office 3,838,021
Patented Sept. 24, 1974

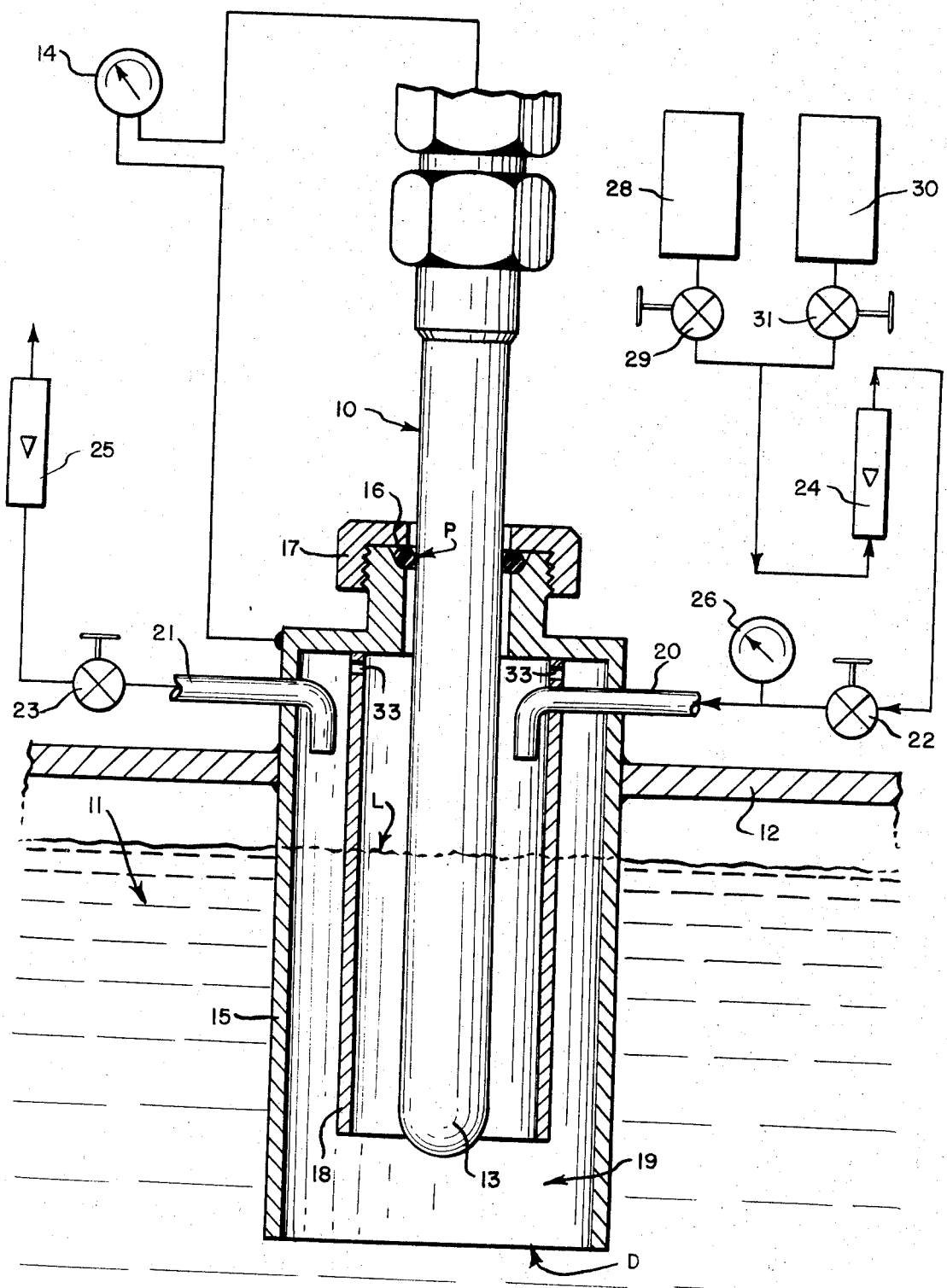

3,838,021
METHOD AND APPARATUS FOR IN SITU CALI-BRATION OF ELECTROCHEMICAL SENSORS
William Arbiter, Yonkers, N.Y., assignor to United Nuclear Corporation, Elmsford, N.Y.
Filed July 18, 1973, Ser. No. 380,381
Int. Cl. G01n 27/30, 27/46
U.S. Cl. 204—1 T
6 Claims

ABSTRACT OF THE DISCLOSURE

An electrochemical sensor that monitors the concentration of a particular foreign substance (e.g. hydrogen) in a fluid medium (e.g. a molten metal) by measuring the electrochemical activity of this substance in the fluid medium is calibrated without removing the sensor from the fluid medium. A shroud is provided that surrounds the portion of the sensor immersed in the fluid medium and that extends beyond the end thereof. An inert gas (e.g. helium) is introduced into the space between the sensor and the shroud to displace the fluid medium therefrom. The inert gas is then replaced with a calibrating gas containing a known amount of the particular substance being monitored, and the electrochemical activity of the substance in the calibrating gas is measured by the sensor. The calibrating gas is then replaced by a further quantity of the inert gas to flush the calibrating gas therefrom, and the fluid medium is then allowed to reenter the space between the sensor and the shroud. The electrochemical activity of the particular foreign substance in the fluid medium being monitored is then measured by the sensor, and this reading is compared with the reading obtained from the calibrating gas to provide an accurate indication of the concentration of the foreign substance in the fluid medium.

BACKGROUND OF THE INVENTION

(1) Field of the Invention

This invention relates to electrochemical sensors designed to monitor the concentration of particular foreign substances (e.g. impurities) in molten metals and other fluids, and in particular it relates to a method and apparatus for calibrating such electrochemical sensors without removing them from the fluid being monitored.

(2) Prior Art

It is frequently important to monitor the concentration of certain foreign substances (e.g. deleterious impurities) in molten metals and other fluids. For example, the presence of an excessive amount of hydrogen or oxygen in molten sodium may damage the piping and other parts of nuclear reactors in which this metal is employed as a coolant, and the presence of these and other gases in other molten metals, for example, molten aluminum, may have an adverse effect on the quality of metal products produced therefrom. Accordingly, a number of means have been devised for monitoring the concentration of particular foreign substances in fluid mediums. One type of such device comprises an electrochemical sensor that is immersed in the fluid medium (e.g. a molten metal) being monitored and that measures the electrochemical activity of the fluid medium containing an unknown concentration of the particular foreign substance. The reading thus obtained is then compared with the electrochemical activity of a reference fluid containing a known concentration of the foreign substance, thereby obtaining an accurate indication of the concentration of the foreign substance in the fluid medium being monitored.

The usual electrochemical sensor acts as a simple voltaic cell when immersed in the fluid medium being monitored. That is to say, immersion of the electrochemical sensor in a molten metal establishes an electrolytic cell in which the molten metal being monitored comprises one electrode of the cell and a reference electrode of known potential within the sensor comprises the other electrode of the cell. The difference in potential between the two electrodes, as measured by an external potentiometer, provides an accurate measure of the electrochemical activity, and hence the concentration, of the foreign substance in the molten metal. Electrochemical sensors of this general type are exemplified by, but not limited to, the devices described in the following U.S. patents: Nos. 3,309,233 to McPheeters, McGuire and Tercovich; 3,378,478 to Kolodney and Steinmetz; 3,481,-855 to Kolodney, Minushkin and Rosh; 3,565,769 to Holden and Kolodney; and 3,649,473 to Holden and Fuhrman.

Before an electrochemical sensor can be placed in service it must be calibrated by using it to measure the electrochemical activity of a number of samples of a reference fluid which contain various known concentrations of the foreign substance being monitored. The calibrated instrument is then installed in an appropriate place in the equipment (for example, the piping or the reservoir of a heat exchanger) containing the fluid medium being monitored. In the course of time minor changes may take place on the surface of or within the sensor which affect the electrical properties and hence the calibration of the device. When this happens, the sensor must be removed from the equipment in which it is installed for recalibration. The need to remove the device from the equipment for periodic recalibration is inconvenient and costly. In addition, many sensors are constructed of materials which deteriorate or erode gradually when immersed in liquid metal, and this shortens the useful life of those sensors which are subject to this type of destructive action.

After an intensive investigation of the problem involved in the calibration and recalibration of electrochemical sensors, I have devised a new method and apparatus for calibrating such sensors without removing them from the fluid being monitored. Moreover my new means for recalibrating electrochemical sensors can be employed to protect and prolong the life of such sensors by minimizing exposure of the sensor to the possibly harmful effects of the fluid being monitored.

SUMMARY OF THE INVENTION

The new means I have devised for recalibrating electrochemical sensors without removing the sensor from the site of installation may be used in conjunction with all such sensors in which a portion of the sensor is normally at least partially immersed in a fluid medium containing a variable concentration of the particular substance being monitored. A shroud surrounds the portion of the sensor that is normally immersed in the fluid medium, the shroud extending along the sensor is spaced relationship thereto from a point on the sensor removed from the portion of the sensor normally immersed in the fluid medium to a point beyond the end of said portion. The upper end of the shroud is in gas-tight closed relationship with respect to the sensor at the point thereon removed from the end thereof, and the other end of the shroud is in open communication with the surrounding environment at the point beyond the end of the sensor, the shroud thereby defining a fluid evacuation zone surrounding the sensor as hereinafter described. Gas inlet means and gas outlet means are provided which communicate with the fluid evacuation zone defined by the shroud, both gas inlet means and gas outlet means having a gas flow control means associated therewith. A source of an inert first gas is connected to the gas inlet means and means for controlling the flow of said inert gas is provided, said inert gas being electrochemically inert with respect to the sensor. A source of a calibrating second gas is also connected to the gas inlet means and means for controlling the flow of said calibrating gas are provided, said calibrating gas containing a known amount of the particular foreign substance being monitored. Additional sources of the calibrating gas containing other known amounts of the foreign substance may be provided as desired.

The foregoing device is employed to calibrate the sensor in situ by introducing the inert first gas into the fluid evacuation zone defined by the shroud to displace the fluid medium and force it from said zone. Advantageously, after the fluid medium has been forced from the fluid evacuation zone, the inert gas is allowed to escape continuously from the zone through the gas outlet means communicating therewith at the same rate at which said inert gas is being introduced into said zone. The calibrating second gas is then introduced into the fluid evacuation zone at the same rate while, at the same time, shutting off the flow of the inert first gas so as to replace the first gas with the second gas in the evacuation zone. The electrochemical activity of the particular foreign substance being monitored present in the second gas is measured by means of the electrochemical sensor, and this reading is recorded. A further quantity of the first gas is then introduced into the fluid evacuation zone while allowing the second gas to escape from said zone so as to flush out and replace the second gas with the first gas in said zone. This procedure may be repeated with other calibrating gases containing other known amounts of the foreign substance being monitored to determine the electrochemical activity of the foreign substance in these other calibrating gases. After the last of the calibrating gas has been flushed from the fluid evacuation zone by the inert first gas, the flow of said first gas is shut off to allow the fluid medium being monitored to reenter the fluid evacuation zone. The activity of the particular foreign substance in the fluid medium being monitored is measured by the electrochemical sensor, and this activity is compared with the readings obtained from the calibrating gas (or gases) to provide an accurate indication of the concentration of the foreign substance in the fluid medium.

In the event that the materials from which the electrochemical sensor is made are subject to damage or deterioration when exposed for prolonged periods to the fluid medium being monitored, the fluid evacuation zone defined by the shroud can normally be maintained full of the inert first gas so as to keep the fluid medium out of contact with the sensor. When it is desired to determine the concentration of the foreign substance in the fluid medium, the fluid medium is allowed to enter the fluid evacuation zone and the electrochemical activity thereon is measured by the sensor as previously described. Other advantages of my improvement in sensored design will be apparent from the following detailed description thereof.

BRIEF DESCRIPTION OF THE DRAWING

The improvement in electrochemical sensor design of the invention will be better understood from the following description thereof in conjunction with the single figure of the accompanying drawing which shows, schematically, my new means for calibrating the sensor without removing it from the installation site.

DESCRIPTION OF PREFERRED EMBODIMENT

As noted, the present invention relates to means for calibrating electrochemical sensors which are used to monitor the concentration of a particular foreign substance in a fluid medium. Such sensors usually comprise a probe-like element that is immersed in the fluid medium and that is designed to measure the electrochemical activity of the foreign substance of unknown concentration in the fluid medium being monitored. The sensor and the fluid medium being monitored in combination act as a simple voltaic cell the EMF or voltage of which varies directly with changes in the electrochemical activity and concentration of the foreign substance in said fluid medium. The electrochemical activity of the fluid medium being monitored is compared with the electrochemical activity of a reference fluid containing a known concentration of the foreign substance to obtain an accurate measure of the concentration of the foreign substance in said fluid medium. Electrochemical sensors may be designed to detect and measure the electrochemical activity of a variety of foreign substances that may be contained in a variety of fluid mediums. In the interest of simplifying the present description, the invention will be described in conjunction with an electrochemical sensor designed to detect and measure the electrochemical activity of a specific substance [e.g. hydrogen] in a specific fluid medium (e.g. a liquid metal such as molten sodium), but the invention is not limited to either of these specific substances.

As shown in the drawing, the usual electrochemical sensor comprises a probe-like member or sensor 10 that is partially immersed in the liquid metal 11 being monitored. The liquid metal 11 is contained in a suitable vessel 12 with the upper surface of the liquid metal at the level L, the lower end portion 13 of the sensor 10 normally being immersed in and contacted by the liquid metal up to the level L. Immersion of the sensor 10 in the liquid metal 11 establishes an electrolytic cell in which the liquid metal comprises one electrode of the cell and a reference electrode of known potential within the sensor comprises the other electrode of the cell. The liquid metal 11 and the reference electrode within the sensor 10 are electrically connected to an external potentiometer 14 which measures the difference in potential between the two electrodes. The difference in potential between the two electrodes, as measured by the potentiometer 14, provides an accurate measure of the electrochemical activity, and hence the concentration, of the foreign substance in the liquid metal 11.

Before the electrochemical sensor 10 is placed in service, it is calibrated by using it to measure the electrochemical activity of a number of samples of a reference fluid which contain various known concentrations of the foreign substance being monitored. A calibration curve can then be drawn for the sensor expressing the concentration of the foreign substance in terms of volts. The calibrated instrument is then installed in an appropriate place in the equipment (for example, the vessel 12) containing the fluid medium being monitored. Recalibration of the instrument is necessary from time to time to insure the continued accuracy thereof, and to carry out the recalibration procedure it has heretofore been necessary to remove the instrument from the equipment in which it is installed.

The present means for recalibrating the sensor 10 without removing it from the equipment in which it is installed comprises a shroud 15 that surrounds the portion 13 of the sensor 10 that is immersed in the fluid medium 11. The shroud 15 extends along the sensor in spaced relationship thereto from a point P on the sensor removed from the portion 13 of the sensor normally immersed in the fluid medium to a point D beyond the end of said portion 13 of the sensor. The shroud 15 is in gas-tight closed relationship with respect to the sensor 10 at the point P and is in open communication with the surrounding environment at the point D beyond the end of the sensor. The gas-tight closure or seal at the point P is advantageously obtained by means of the O-ring 16 and nut 17, although other means may obviously be used. A baffle 18 is advantageously positioned within the shroud 15 between the shroud and the sensor 10 as hereinafter described.

The shroud 15 defines a fluid evacuation zone 19 which surrounds the sensor 10 from the point P to the point D. Gas inlet means comprising the pipe 20 and gas outlet means comprising the pipe 21 communicate with the fluid evacuation zone 19 defined by the shroud 15. Gas flow control means comprising the valve 22 is associated with and controls the flow of gas to the gas inlet pipe 20, and gas flow control means comprising the valve 23 is associated with and controls the flow of gas from the gas outlet pipe 21. A gas flow meter 24 is installed in the line leading to the gas inlet pipe 20 and a gas flow meter 25 is installed in the line leading from the gas outlet pipe 21 to measure the rate of gas flow to and from the pipes 20 and 21, respectively. A gas pressure gauge 26 is provided for measuring the pressure of the gas within the fluid evacuation zone 19 defined by the shroud 15.

A source of an inert gas 28 is connected to the gas flow meter 24 and thence to the gas inlet pipe 20, valve means 29 being provided for controlling the flow of said inert gas 28 to the gas inlet pipe 20. At least one source of a calibrating gas 30 is also connected to the gas flow meter 24 and thence to the gas inlet pipe 20, the valve means 31 being provided to control the flow of said calibrating gas to the inlet pipe 20. The inert gas 28 is electrochemically inert with respect to the sensor 10, and advantageously comprises helium or argon. The calibrating gas 30 comprises an electrochemically inert gas (for example, helium or argon) that contains a known amount or concentration of the particular foreign substance being monitored (for example, hydrogen). Additional sources of different calibrating gases containing different known amounts of the foreign substance being monitored may be provided if desired.

To recalibrate the sensor 10, the valves 22 and 29 are opened to introduce the inert gas 28 into the fluid evacuation zone 19 defined by the shroud 15, the inert gas displacing the molten metal 11 and forcing it downwardly within the zone 19. As the level of liquid metal 11 within the shroud 15 is forced downwardly, the gas pressure within the shroud increases and this increase in pressure is indicated by the pressure gauge 26. When the level of the liquid metal within the shroud is forced below the lower end of the sensor 10 (say, to the level of point D), the gas pressure will reach a predetermined value at which point the flow of the inert gas 28 may be shut off. Alternatively, when the gas pressure reaches this predetermined value the valve 23 may be opened to allow the inert gas to escape from the fluid evacuation zone 19. In this case the rate of flow of the inert gas 28 being introduced into the zone 19 through the pipe 20 and escaping from the zone through the pipe 21 should be equalized and adjusted by means of the valves 22 and 23 and the flow meters 24 and 25 so that the gas pressure within the zone 19 is maintained at the desired predetermined value. The continuous flow of the inert gas through the zone 19 flushes the zone and removes all traces of the foreign substance being monitored therefrom. The electrochemical activity of the inert gas in the zone 19 is then measured by means of the sensor 10, and the voltage reading thus obtained is the "zero" data point of a new calibration curve for the sensor 10.

After all traces of the foreign substance being monitored are flushed from the fluid evacuation zone 19, the valve 29 is closed and the valve 31 is opened to introduce the calibrating gas 30 into the zone 19. When the calibrating gas 30 has completely replaced the inert gas 28 in the zone 19, the electrochemical activity of the calibrating gas is measured by means of the sensor 10 and the potentiometer 14. The voltage reading thus obtained corresponds to the known concentration of the foreign substance being monitored present in the calibrating gas 30 and thus comprises a data point on the new calibration curve for the sensor 10. Depending on the circumstances and requirements of a particular case, a single data point obtained by measuring the electrochemical activity of only one calibrating gas may be sufficient for recalibration of the sensor 10. However, the above procedure can be repeated with other calibrating gases containing different known amounts of the foreign substance being monitored to obtain additional data points for the new calibration curve. In any case, the new calibration curve thus obtained for the electrochemical sensor 10 provides the basis for an accurate determination of the electrochemical activity, and hence the concentration, of the foreign substance present in the liquid metal 11 being monitored.

In order to determine the electrochemical activity of the particular foreign substance in the liquid metal 11 being monitored, the flow of calibrating gas 30 is shut off by closing the valve 31, and all traces of the calibrating gas are advantageously flushed from within the fluid evacuation zone 19 by opening the valve 29 to allow the inert gas 28 to flow into and escape from the zone 19. The flow of inert gas 28 is then shut off and the liquid metal 11 is allowed to reenter the fluid evacuation zone 19 defined by shroud 15. After the liquid metal 11 reaches the level L within the shroud 15, the electrochemical activity of the liquid metal is determined by means of the sensor 10 and the potentiometer 14. Comparison of the voltage reading thus obtained with the voltage readings obtained as a result of the recalibration procedure described above provides an accurate measure of the electrochemical activity, and hence the concentration of the substance in the liquid metal 11 being monitored. If the concentration of the foreign substance in the liquid metal 11 is higher or lower than desired, measures well known in the art may be employed to reduce or increase the amount of the foreign substance in the liquid metal to bring it to the desired level.

The material from which the sensor 10 is made is sometimes somewhat incompatable with the liquid metal 11 being monitored in which case contact between the sensor 10 and the liquid metal 11 should be held to the minimum time possible. To achieve this result, inert gas 28 may be introduced into the fluid evacuation zone 19 defined by the shroud 15 until the pressure gauge 26 indicates that the level of the liquid metal within the shroud has been forced below the lower end of the sensor 10. The liquid metal 11 may then be maintained out of direct contact with the sensor 10 until such time as it is desired to measure the electrochemical activity of the foreign substance present in the liquid metal. At this time, the liquid metal is allowed to rise within the shroud 15 to the level L for determination of the activity of the foreign substance in the liquid metal.

When the level of the liquid metal 11 within the shroud 15 is maintained below the lower end of the sensor 10, vapors of the liquid metal have a tendency to condense on the outer surface of the sensor 10. The condensation of liquid metal vapor on the sensor 10 can be prevented by adjusting the gas flow patterns and flow rates within the shroud 15 so as to keep the area immediately adjacent the sensor 10 free of metal vapor. This may be accomplished by providing a baffle 18 which directs and confines the incoming inert gas 28 to the immediate vicinity of the surface of the sensor 10 thereby sweeping this area free of metal vapors which might otherwise condense on the sensor. Pressure equalization holes 33 may be formed in the baffle 18 to equalize the gas pressure within the fluid evacuation zone on both sides of the baffle 18.

It is sometimes desirable to maintain the sensor at or near its operating temperature (that is, the temperature of the liquid metal 11) even when the level of liquid metal within the shroud 15 has been forced downwardly out of contact with the sensor 10. In such case, the inert gas 28 being introduced into the fluid evacuation zone 19 may be preheated to the operating temperature of the device to maintain the sensor 10 at its operating temperature. The use of preheated gas in this context also serves to prevent the condensation of liquid metal vapors on the surface of the sensor 10.

Other advantages of my improved sensor design will be apparent to those skilled in the art.

I claim:

1. In apparatus for monitoring the concentration of a particular foreign substance in a fluid medium, said apparatus having an electrochemical sensor adapted to measure the electrochemical activity of said particular foreign substance, a portion of said sensor being adapted to be at least partly immersed in a fluid medium containing a variable concentration of said particular foreign substance being monitored, the improvement which comprises:
   a shroud surrounding the portion of the sensor that is adapted to be immersed in said fluid medium, said shroud extending along said sensor in spaced relationship thereto from a point on the sensor removed from the portion of the sensor normally immersed in the fluid medium to a point beyond the end of said portion, said shroud being in gas-tight closed relationship with respect to the sensor at the point thereon removed from the end thereof and being in open communication with the surrounding environment at the point beyond the end of the sensor, whereby said shroud defines a fluid evacuation zone surrounding said sensor,
   gas inlet means communicating with the fluid evacuation zone defined by the shroud and having gas flow control means associated therewith,
   gas outlet means communicating with the fluid evacuation zone defined by the shroud and having gas flow control means associated therewith,
   a source of an inert gas connected to the gas inlet means and means for controlling the flow of said inert gas to said gas inlet means, said inert gas being electrochemically inert with respect to the sensor, and
   at least one source of a calibrating gas connected to the gas inlet means and means for controlling the flow of said gas inlet means, said calibrating gas containing a known amount of the particular foreign substance being monitored.

2. Apparatus according to claim 1 in which a gas flow baffle is positioned within the shroud between the shroud and the sensor.

3. Apparatus according to claim 2 in which the gas inlet means communicates with the space between the outer surface of the sensor and the inner surface of the baffle, and in which the gas outlet means communicates with the space between the outer surface of the baffle and the inner surface of the shroud.

4. Apparatus according to claim 1 in which means are provided for measuring the pressure of the gas within the fluid evacuation zone defined by the shroud.

5. Method for calibrating an electrochemical sensor that is designed to detect and to measure the electrochemical activity of a particular foreign substance in a fluid medium and that is normally at least partly immersed in said fluid medium containing a variable concentration of said particular foreign substance being monitored, the method comprising
   establishing a fluid evacuation zone surrounding the portion of the sensor normally immersed in said fluid medium, said zone being in communication with the main body of said fluid medium,
   introducing an inert first gas into said fluid evacuation zone to displace said fluid medium and force it from said zone, said first gas being electrochemically inert with respect to the sensor,
   introducing a calibrating second gas into said fluid evacuation zone while withdrawing said first gas from said zone so as to replace said first gas with said second gas in said zone, said second gas comprising said inert first gas containing a known amount of the substance being monitored,
   measuring the activity of the particular substance being monitored in the second gas as indicated by said sensor,
   introducing a further quantity of said first gas into said fluid evacuation zone while withdrawing said second gas from said zone so as to replace said second gas with said first gas in said zone,
   re-introducing the fluid medium being monitored into the fluid evacuation zone,
   measuring the activity of the particular substance being monitored in the fluid medium as indicated by said sensor.

6. Method according to claim 5 in which a calibrating third gas is introduced into said evacuation zone while withdrawing said calibrating second gas from said zone so as to replace said second gas with said third gas in said zone, said third gas comprising said inert first gas containing another known amount of the substance being monitored, and in which the activity of the particular substance being monitored in said calibrating third gas is measured as indicated by said sensor.

References Cited
UNITED STATES PATENTS 3,654,111   4/1972   Csuros et al. _____ 204—195 S GERALD L. KAPLAN, Primary Examiner U.S. Cl. X.R.

204—195 S

UNITED STATES PATENT OFFICE
CERTIFICATE OF CORRECTION

Patent No. 3,838,021  Dated September 24, 1974

Inventor(s) WILLIAM ARBITER

It is certified that error appears in the above-identified patent and that said Letters Patent are hereby corrected as shown below:

Column 2, line 57, "is" should read -- in --

Column 4, lines 12 and 13, "de-igned" should read -- de-signed -- line 19, "specific substance" should read -- specific foreign substance --

Column 6, line 27, "the substance" should read -- the foreign substance --

Column 7, line 36, "flow of said gas inlet means" should read -- flow of said calibrating gas to said gas inlet means --

Signed and sealed this 3rd day of December 1974.

(SEAL)
Attest:

McCOY M. GIBSON JR.
Attesting Officer

C. MARSHALL DANN
Commissioner of Patents